United States Patent
Rocheblave

(10) Patent No.: US 9,783,240 B2
(45) Date of Patent: Oct. 10, 2017

(54) LATERAL UPRIGHT FOR MOTOR VEHICLE BODY SHELL

(71) Applicant: Compagnie Plastic Omnium, Lyon (FR)

(72) Inventor: Laurent Rocheblave, Villeurbanne (FR)

(73) Assignee: Compagnie Plastic Omnium, Lyon (FR)

( * ) Notice: Subject to any disclaimer, the term of this patent is extended or adjusted under 35 U.S.C. 154(b) by 0 days.

(21) Appl. No.: 14/906,930

(22) PCT Filed: Jul. 24, 2014

(86) PCT No.: PCT/FR2014/051925
§ 371 (c)(1),
(2) Date: Jan. 22, 2016

(87) PCT Pub. No.: WO2015/011422
PCT Pub. Date: Jan. 29, 2015

(65) Prior Publication Data
US 2016/0152277 A1    Jun. 2, 2016

(30) Foreign Application Priority Data
Jul. 25, 2013 (FR) ...................................... 13 57331

(51) Int. Cl.
*B62D 25/04* (2006.01)
*B62D 29/00* (2006.01)
*B62D 29/04* (2006.01)

(52) U.S. Cl.
CPC ........... *B62D 25/04* (2013.01); *B62D 29/004* (2013.01); *B62D 29/005* (2013.01); *B62D 29/04* (2013.01)

(58) Field of Classification Search
CPC ........ B62D 25/02; B62D 25/04; B62D 29/04; B62D 29/005
(Continued)

(56) References Cited

U.S. PATENT DOCUMENTS 5,385,421 A * 1/1995 Morgan ................. B22D 19/04
164/111
6,082,811 A   7/2000 Yoshida
(Continued)

FOREIGN PATENT DOCUMENTS

CN    1173544    2/1998
CN    1414916    4/2003
(Continued)

OTHER PUBLICATIONS

International Search Report PCT/ISA/210 for International Application No. PCT/FR2014/051925 dated Sep. 8, 2014.
(Continued)

*Primary Examiner* — Dennis H Pedder
(74) *Attorney, Agent, or Firm* — Harness, Dickey & Pierce, P.L.C.

(57) ABSTRACT

This lateral upright for a motor vehicle body shell is intended to separate two window openings of the body shell, for example two lateral window openings at the front and rear. It comprises at least one stiffening section comprising two side plates that are substantially parallel to one another and are connected together by a web. The section is made of composite material. The side plates are intended to extend substantially parallel to a lateral window opening of the body shell. The web of the section made of composite material forms, with the side plates, a cellular structure.

19 Claims, 2 Drawing Sheets

(58) Field of Classification Search
USPC .......................... 296/193.06, 203.01–203.04
See application file for complete search history.

(56) References Cited

U.S. PATENT DOCUMENTS

| | | | |
|---|---|---|---|
| 2005/0281999 A1* | 12/2005 | Hofmann | B32B 5/18 |
| | | | 428/304.4 |
| 2006/0186705 A1* | 8/2006 | Rashidy | B60J 7/126 |
| | | | 296/193.06 |
| 2008/0075917 A1* | 3/2008 | Park | B21D 47/00 |
| | | | 428/117 |
| 2010/0173126 A1 | 7/2010 | Malek et al. | |
| 2012/0153669 A1 | 6/2012 | Nagwanshi et al. | |
| 2013/0313862 A1 | 11/2013 | Yamaji et al. | |

FOREIGN PATENT DOCUMENTS

| | | |
|---|---|---|
| CN | 101786470 | 7/2010 |
| CN | 101861265 | 10/2010 |
| DE | 10 2004 008006 A1 | 9/2005 |
| DE | 10 2007 053354 A1 | 5/2009 |
| DE | 10 2008 032344 A1 | 1/2010 |
| DE | 10 2008 058225 A1 | 7/2010 |
| DE | 10 2011 111232 A1 | 2/2013 |
| EP | 1 142 739 A1 | 10/2001 |
| EP | 2 383 170 A1 | 11/2011 |
| FR | 2959981 * | 11/2011 |
| WO | WO-2012/105716 A1 | 8/2012 |

OTHER PUBLICATIONS

Written Opinion of the International Searching Authority PCT/ISA/237 for International Application No. PCT/FR2014/051925 dated Sep. 8, 2014.

French Search Report and Written Opinion for French Application No. FR 1357331 dated Jun. 18, 2014.

* cited by examiner

LATERAL UPRIGHT FOR MOTOR VEHICLE BODY SHELL

CROSS-REFERENCE TO RELATED APPLICATIONS

This application is a national phase under 35 U.S.C. §371 of PCT International Application No. PCT/FR2014/051925 which has an International filing date of Jul. 24, 2014, which claims priority to French Patent Application No. 1357331, filed Jul. 25, 2013, the entire contents of each of which are hereby incorporated by reference.

This invention relates to an improved pillar for motor vehicle body shell.

In the remainder of this document, a bay of a motor vehicle body designates an opening in the body generally forming a passage for a person or a visual access between the inside and the outside of the vehicle. There are, for example, bays for vehicle doors and windows, windscreen and rear window.

More particularly, a motor vehicle body shell generally comprises at least two lateral pillars, respectively left and right, each intended to separate two lateral bays at the front and rear of the body shell. Each lateral pillar, also called in this case the "B pillar", helps to protect the passenger compartment by forming a member absorbing side impacts.

It is known that a lateral pillar made of sheet metal can be formed by assembling three elements made of stamped sheet metal. A first central element is generally made of steel of high mechanical strength. A second element is assembled on the first central element so as to form a lining thereof inside the passenger compartment. A third element is assembled on the first central element so as to form an appearance part visible mainly from outside the passenger compartment when the vehicle doors are open.

After assembly, the three pressed sheet metal elements form a generally box-shaped structure relatively well adapted for absorbing side impacts. However, a lateral pillar comprising three metal elements is relatively heavy. Furthermore, given the various functions of the elements forming the lateral pillar, metals whose properties are adapted to each function are required. The use of metals having different properties means that the lateral pillar is relatively expensive to manufacture.

EP 1 142 739 proposes a metal member capable of forming a lateral pillar for motor vehicle body shell. More particularly, EP 1 142 739 proposes a lateral pillar for motor vehicle body shell intended to separate two lateral bays at the front and rear of the body shell, of the type comprising at least one stiffening section comprising two side plates that are substantially parallel to one another and are connected together by a core.

In EP 1 142 739, the stiffening section has a generally I-shaped cross-section formed by the two side plates connected together by the core. The core is formed by a substantially flat central wall connecting the two substantially parallel side plates extending substantially perpendicular to these two side plates. Furthermore, the thickness of each side plate of the stiffening section varies significantly between the edge of the side plate connected to the core and the free edge of this side plate, such that the thickness of the free edge of the side plate is significantly reduced compared with the thickness of the edge of the side plate connected to the core.

EP 1 142 739 proposes to make, where appropriate, the I-shaped stiffening section of composite material. It turns out, however, keeping the same shape, that the behaviour of the lateral pillar during an impact is unsatisfactory if the metal is replaced by a composite material. Thus, the edges of the flat core connected to the side plates are relatively straight and extend substantially vertically over the entire height of the stiffening section thereby making the pillar unstable during a side impact suffered by the vehicle under the effect of forces offset with respect to the core connecting edge. If the stiffening section is made of a composite material, undesirable torsional deformations are generated in it during a side impact.

Furthermore, since the free edges of the side plates are thin, when they are made of composite material cracking could occur in these free edges and propagate towards the core of the stiffening section.

The main objective of the invention is to propose a lateral pillar for motor vehicle body shell which is relatively light and easy to manufacture.

The invention therefore relates to a lateral pillar for motor vehicle body shell intended to separate two bays of the body shell, for example two lateral bays at the front and rear, at least one of the bays being lateral of the type comprising at least one stiffening section comprising two side plates that are substantially parallel to one another and are connected together by a core, characterised in that the stiffening section is made of composite material, the side plates being intended to extend substantially parallel to the lateral bay of the body shell, the core of the section made of composite material forming, with the side plates, a honeycomb structure.

Since the core of the section made of composite material forms, with the side plates, a honeycomb structure, the edges of the core connected to the side plates extend in more than one direction, not just substantially vertically over the entire height of the stiffening section. Furthermore, the honeycomb structure of the lateral pillar according to the invention forms light means for stiffening this lateral pillar which can therefore efficiently absorb the side impacts suffered by the vehicle.

Furthermore, the stiffening section made of composite material can be manufactured by relatively simple conventional moulding, injection and stamping methods, etc.

Preferably, the thickness of each side plate of the stiffening section is substantially constant.

Thus, by not having to reduce the thickness of the free edges of the side plates, the risk of cracking of this free edge, which weakens the stiffening sections, is avoided.

According to other optional characteristics of various embodiments of this lateral pillar:
- the composite material forming at least one side plate, preferably forming each side plate, comprises continuous reinforcing fibres extending substantially parallel to the longitudinal direction of the pillar, the length of the fibres possibly reaching, where appropriate, the length of the stiffening section;
- the composite material forming the core comprises cut reinforcing fibres with random orientation;
- the section made of composite material extends a metal portion of the pillar, preferably a lower metal portion of this pillar;
- the metal portion of the pillar is made of either steel or aluminium, comprising, where appropriate, magnesium;
- the section made of composite material is housed, at least partially, in a metal box of U-shaped cross-section comprising a metal core supported on a first side plate of the section made of composite material, the second side plate of this section made of composite material closing the metal box of U-shaped cross-section;

the section made of composite material has a generally I-shaped cross-section formed by the two side plates substantially parallel to one another,
the core of the section made of composite material comprising:
a substantially flat central wall connecting the two substantially parallel side plates by extending substantially perpendicular to these two side plates, and
ribs made of composite material extending each side of the central wall and between the two side plates so as to connect the central wall and the two side plates together,
these ribs defining cells of the honeycomb structure of the core;
the ribs defining the cells extend substantially perpendicular to the central wall and to the two side plates,
the section made of composite material is formed by joining two elements of U-shaped cross-section each having an elementary core extended by two elementary side plates, the central wall of the core of the section made of composite material being formed by the junction side against side of the elementary cores of the elements of U-shaped cross-section and each side plate of the section made of composite material being formed by two elementary side plates of the elements of U-shaped cross-section extending opposite one another;
the core of the section made of composite material includes a corrugated central wall connecting the two side plates, forming arches inverting alternately and curving around imaginary axes substantially perpendicular to the side plates, these arches defining cells of the honeycomb structure of the core;
the core of the section made of composite material further includes ribs connecting the central wall and the two side plates;
the ribs are inclined relative to the axes around which the arches curve and, where appropriate, cross each other;
the composite material comprises a polymer selected in particular from a thermoplastic polymer and a thermosetting polymer, for example a polyamide (PA, especially PA 6 or PA-6.6), a polybutylene terephthalate (PBT), a mixture of polycarbonate and polybutylene terephthalate (PC-PBT), a polymethyl methacrylate (PMMA), or a vinyl ester (VE), an SMC (Sheet Moulding Compound), an epoxy (EP) or a polyester;
the composite material comprises reinforcing fibres of a material selected from glass, carbon or steel, and arranged according to a structure selected from a woven structure, a non-woven stitched one-directional sheet of type NCF (Non Crimp Fabric), optionally biaxial or a braided structure.

The invention will be better understood on reading the following description, given solely by way of example and with reference to the accompanying drawings in which:

FIGS. 1 and 2 show a lateral pillar 10 for motor vehicle body shell, also called a "B pillar", according to a first embodiment of the invention.

This pillar 10 is intended to separate two lateral bays at the front and rear of the motor vehicle body shell.

The lateral pillar 10 comprises at least one stiffening section 12 made of composite material. In the example shown on FIGS. 1 and 2, the stiffening section 12 extends over the entire height of the lateral pillar 10.

The stiffening section 12 comprises two side plates 14A, 14B that are substantially parallel to one another and are connected together by a core 16.

The side plates 14A, 14B are intended to extend substantially parallel to the bays of the body shell, i.e. substantially parallel to a median longitudinal vertical plane of the body shell. The core 16 of the section 12 made of composite material forms, with the side plates 14A, 14B, a honeycomb structure efficiently stiffening this section 12.

The composite material comprises a polymer selected in particular from a thermoplastic polymer and a thermosetting polymer, for example a polyamide (PA, especially PA 6 or PA-6.6), a polybutylene terephthalate (PBT), a mixture of polycarbonate and polybutylene terephthalate (PC-PBT), a polymethyl methacrylate (PMMA), or a vinyl ester (VE), an SMC (Sheet Moulding Compound), an epoxy (EP) or a polyester.

Furthermore, the composite material comprises reinforcing fibres of a material selected, preferably, from glass, carbon or steel, and arranged, preferably, according to a structure selected from a woven structure, a non-woven stitched one-directional sheet of type NCF (Non Crimp Fabric), optionally biaxial or a braided structure.

Figure 2:
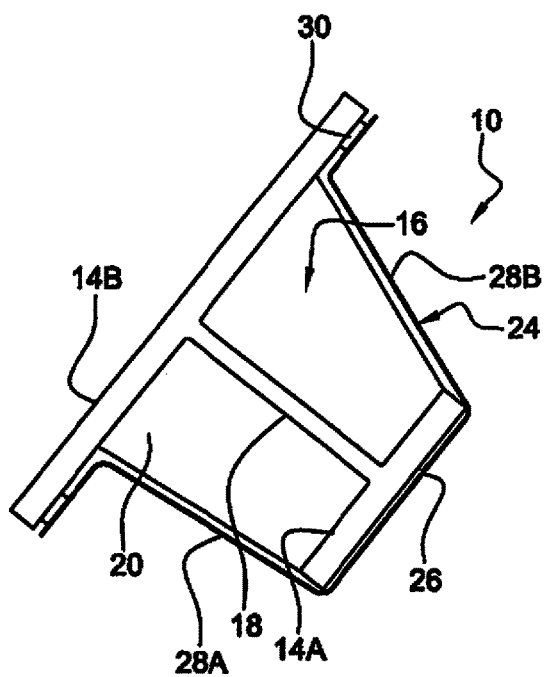
FIG. 2 is a diagrammatic cross-section along line II-II of FIG. 1, showing in addition a metal box.

Referring to FIG. 2, we see that the thickness of each side plate 14A, 14B is substantially constant, for example selected between 3.5 and 6 mm. Preferably, the composite material forming at least one side plate, preferably forming each side plate 14A, 14B, comprises continuous reinforcing fibres extending substantially parallel to the longitudinal direction of the pillar 10. Where appropriate, the length of the continuous fibres may reach the length of the stiffening section.

Preferably the composite material forming the core 16, more particularly the central wall 18 and the ribs 20, comprises cut reinforcing fibres with random orientation.

Figure 1:
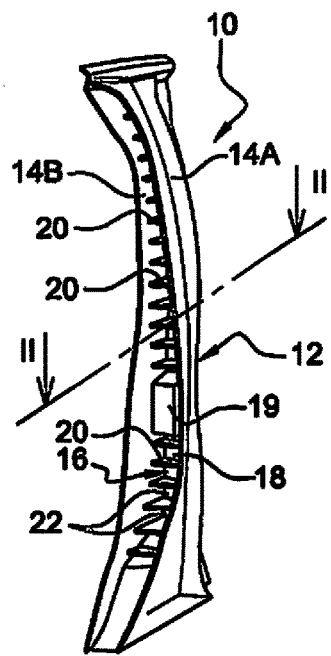
FIG. 1 is a perspective elevation view of a lateral pillar for motor vehicle according to a first embodiment of the invention.

Referring to FIGS. 1 and 2, we see that the section 12 made of composite material has a generally I-shaped cross-section formed by the two side plates 14A, 14B substantially parallel to one another and the core 16.

More particularly, the core of the section 12 includes a substantially flat central wall 18 of substantially constant thickness, for example chosen between 3.5 and 6 mm. The central wall 18 connects the two side plates 14A, 14B by extending substantially perpendicular to these two side plates 14A, 14B.

Where appropriate, the central wall 18 has a plate 19 forming a support for a striker (not shown) of a door locking device of the vehicle.

Furthermore, the core of the section 12 has ribs 20 made of composite material extending each side of the central wall 18 and between the two side plates 14A, 14B so as to connect the central wall 18 and the two side plates 14A, 14B together.

Thus, the ribs 20 define cells 22 of the honeycomb structure of the core 16. Note that in the example illustrated, these ribs 20 extend substantially perpendicular to the central wall 18 and to the two side plates 14A, 14B. The thickness of the ribs 20 is for example between 2 and 6 mm, where applicable being modifiable to obtain a draft profile. The ribs 20 are for example separated by a distance of approximately 40 to 60 mm, the height of the pillar 10 being approximately 1200 mm.

Referring to FIG. 2, we see that the stiffening section 12 is housed, at least partially, in a metal box 24 of U-shaped cross-section. The box 24 includes a metal core 26 extended by two metal side plates 28A, 28B.

Preferably, the metal core 26 rests, at least locally, on a first side plate 14A of the stiffening section 12. The second side plate 14B of this stiffening section 12 closes the metal box of U-shaped cross-section. We see on FIG. 2 in fact that the free edges of the two metal side plates 28A, 28B are connected to the edges of the side plate 14B in a known manner, by conventional means 30, for example rivets, screws, glue beads or welds.

Figure 3:
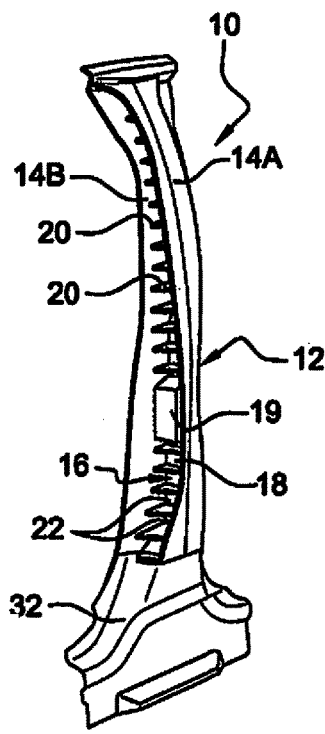
FIG. 3 is a view similar to FIG. 1 of a lateral pillar for motor vehicle according to a second embodiment of the invention.
Figure 4:
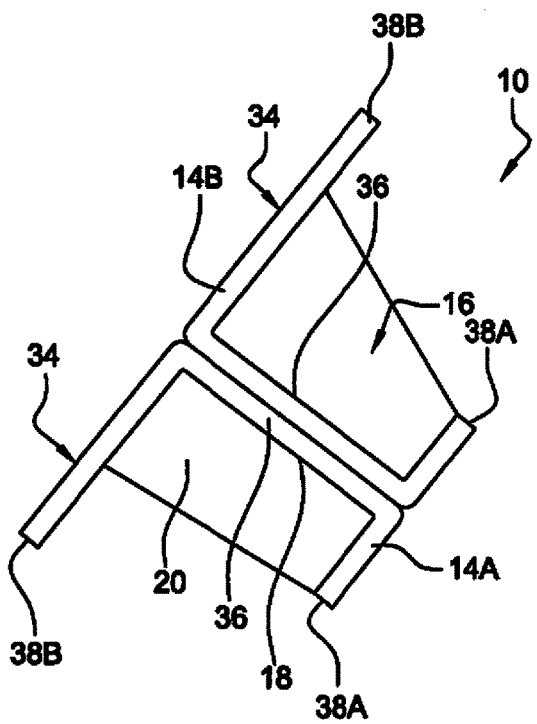
FIG. 4 is a view similar to FIG. 2 of a lateral pillar for motor vehicle according to a third embodiment of the invention.
Figure 5:
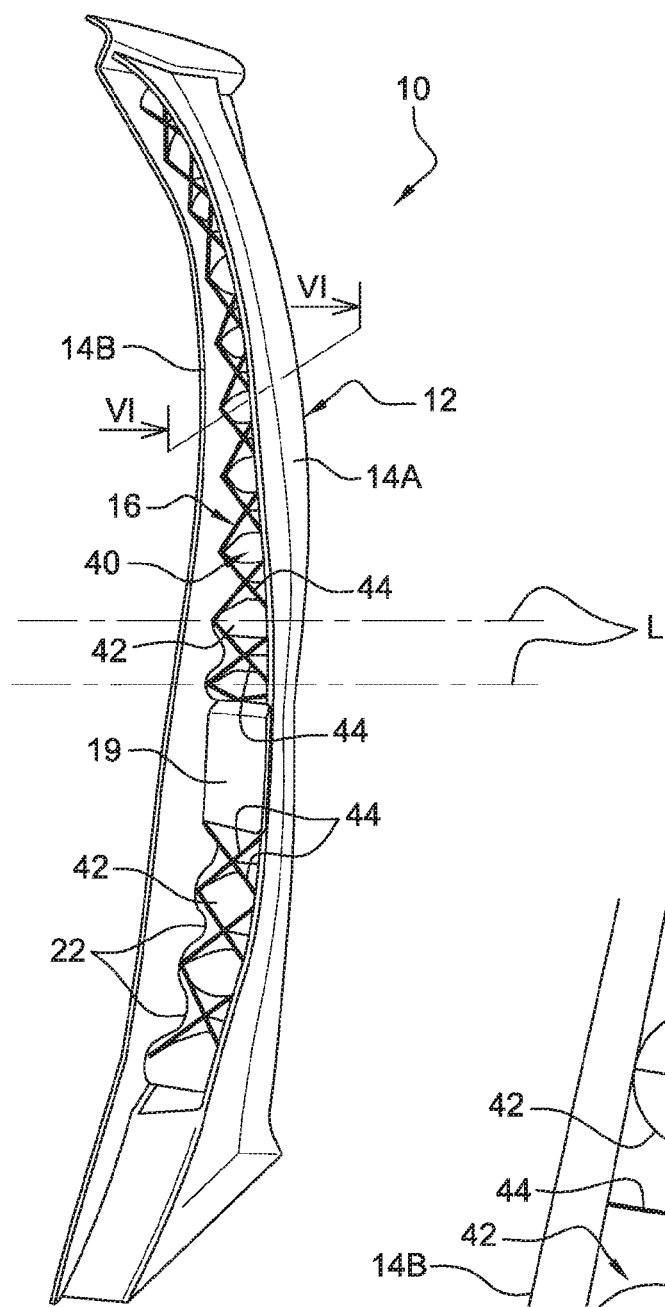
FIG. 5 is a view similar to FIG. 1 of a lateral pillar for motor vehicle according to a fourth embodiment of the invention.

FIGS. 3 to 5 show a lateral pillar 10 according to the second to fourth embodiments of the invention. On these FIGS. 3 to 5, the elements similar to those of the previous figures are designated by the same references.

In the second embodiment of the invention shown on FIG. 3, the lateral pillar 10 comprises a stiffening section 12 made of composite material extending a portion 32 of the pillar 10 separate from this section 12. Preferably, as shown on FIG. 3, the portion 32 is made of metal and forms a lower metal portion of this pillar 10.

The connection between the metal portion 32 and the stiffening section 12 made of composite material creates, in case of a side impact suffered by the vehicle, a ball joint effect limiting the penetration of the upper portion of the pillar 10 in the passenger compartment and thereby further protecting the head of an occupant in this passenger compartment.

The stiffening section 12 made of composite material is connected in a known manner to the metal part 32, for example by riveting, screwing, bonding or overmoulding.

Preferably, the metal portion 32 is made of either steel or aluminium, comprising, where appropriate, magnesium.

Alternatively, the portion 32 of the pillar 10 separate from the stiffening section 12 could be made of a composite material having a structure intended, in case of impact, to dissipate energy more by delaminating than by breaking. This structure could be formed by a polymer overmoulded on a woven stiffener of glass or carbon fibres.

In the third embodiment of the invention shown on FIG. 4, the lateral pillar 10 comprises a stiffening section 12 made of composite material formed by joining two elements 34 of U-shaped cross-section.

Each element 34 has a substantially flat elementary core 36, extended by two elementary side plates 38A, 38B. La central wall 18 of the core 16 of the stiffening section 12 is formed by the junction side against side of the elementary cores 36 of the elements 34 of U-shaped cross-section. Each side plate 14A, 14B of the stiffening section 12 is formed by two elementary side plates 38A, 38B of the elements 34 of U-shaped cross-section extending opposite one another.

The junction side against side of the elementary cores 36 of the elements 34 of U-shaped cross-section can be achieved for example by partial fusion of the junction sides in a mould.

As in the two previous embodiments, the ribs 20 made of composite material extend each side of the central wall 18 (formed by the two elementary cores 36 together) between the two side plates 14A, 14B (formed by the elementary side plates 38A, 38B) so as to connect the central wall 18 and the two side plates 14A, 14B together.

Preferably, in this third embodiment of the invention, the composite material forming each side plate 14A, 14B (formed by the elementary side plates 38A, 38B) and the central wall 18 (formed by the two elementary cores 36 together), comprises continuous reinforcing fibres extending substantially parallel to the longitudinal direction of the pillar 10.

Figure 6:
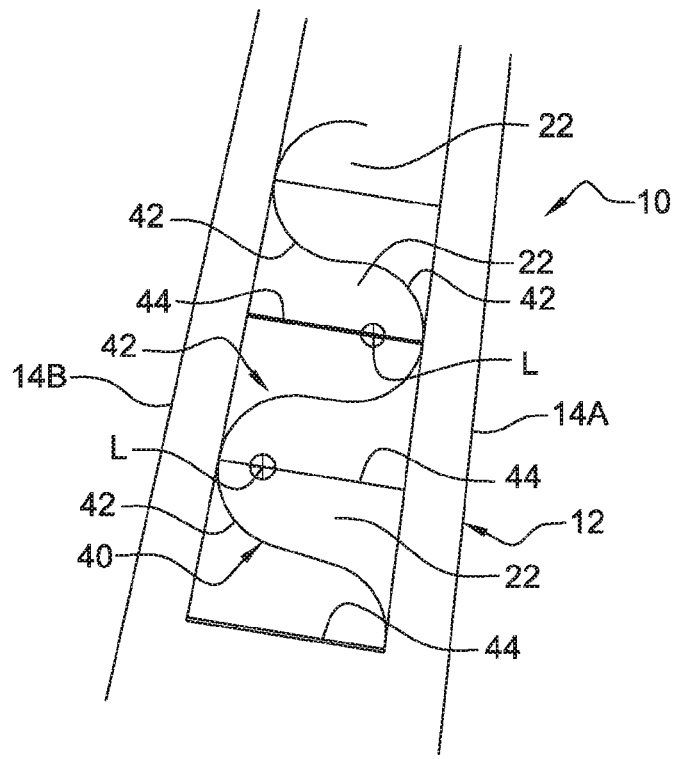
FIG. 6 is a cross-sectional view along plane VI-VI of FIG. 5.

In the fourth embodiment of the invention shown on FIGS. 5 and 6, the core 16 of the stiffening section 12 made of composite material has a corrugated central wall 40 made of composite material 40. This wall 40 connects the two side plates 14A, 14B. The corrugations of the wall 40 form arches 42 inverting alternately and curving around imaginary axes L substantially perpendicular to the side plates 14A, 14B, these arches 42 defining cells 22 of the honeycomb structure of the core 16.

Preferably, the stiffening section 12 further includes ribs 44 connecting the central wall 40 and the two side plates 14A, 14B together. Advantageously, the ribs 44 are inclined relative to the axes L and, where appropriate, as in the example shown on FIG. 5, cross each other.

In this fourth embodiment, the core 16, more particularly the central wall 40 and the ribs 44, is made of a composite material identical to one of those proposed for the central wall 18 and the ribs 20 of the previous embodiments.

The stiffening section 12 according to the various embodiments described above can be manufactured by any appropriate known method, for example by a compression method, an injection method, a stamping method, if necessary carried out using an injection and over-injection mould or by a method for stamping semi-finished intermediate products (or "prepregs").

Note that in a compression type method for manufacturing the stiffening section made of composite material, the length of the cut reinforcing fibres that could be used generally lies between 25 and 50 mm.

However, in an injection type method for manufacturing the stiffening section made of composite material, the length of the cut reinforcing fibres that could be used generally lies between 0.2 and 2 mm.

The invention is not limited to the embodiments described above and other embodiments will be clearly apparent to those skilled in the art.

In particular, the invention is not limited to a lateral pillar for motor vehicle body shell called "B pillar", but concerns any lateral pillar intended to separate two bays of the body shell such that at least one of the bays is lateral. Thus, the invention may relate to a lateral pillar intended to separate a lateral opening bay and a windscreen or a lateral opening bay and a rear window.

The invention claimed is:
1. A motor vehicle body shell comprising:
two bays, at least one of the bays being a lateral bay, the two bays being separated by a lateral pillar having at least one stiffening section, the at least one stiffening section having two substantially parallel side plates connected together by a core, wherein:
the at least one stiffening section includes composite material,
the side plates extend substantially parallel to the lateral bay of the body shell, and the core of the stiffening section that includes the composite material forms, with the side plates, a honeycomb structure;
wherein the stiffening section is housed, at least partially, in a metal box of U-shaped cross-section comprising the core supported on a first side plate of the stiffening section, a second side plate of the stiffening section closing the metal box of U-shaped cross-section.

2. The motor vehicle body shell according to claim 1, wherein a thickness of each side plate is substantially constant.

3. The motor vehicle body shell according to claim 1, wherein the composite material comprises continuous reinforcing fibres extending substantially parallel to a longitudinal direction of the lateral pillar, a length of the fibres being substantially equal to a length of the stiffening section.

4. The motor vehicle body shell according to claim 1, wherein the composite material forming the core comprises cut stiffening fibres of random orientation.

5. The motor vehicle body shell according to claim 1, wherein the at least one stiffening section extends over a metal portion of the lateral pillar.

6. The motor vehicle body shell according to claim 5, wherein the metal portion of the lateral pillar comprises at least one of steel, aluminium, and magnesium.

7. A motor vehicle body shell comprising:
two bays, at least one of the bays being a lateral bay, the two bays being separated by a lateral pillar having at least one stiffening section, the at least one stiffening section having two substantially parallel side plates connected together by a core, wherein:
the stiffening section includes composite material,
the side plates extend substantially parallel to the lateral bay of the body shell, and
the core of the stiffening section that includes the composite material forms, with the side plates, a honeycomb structure;
wherein the stiffening section has a generally I-shaped cross-section formed by the two side plates substantially parallel to one another and the core,
the core of the stiffening section comprising:
a substantially flat central wall connecting the two substantially parallel side plates by extending substantially perpendicular to the two side plates, and
ribs including composite material extending each side of the central wall and between the two side plates so as to connect the central wall and the two side plates together,
the ribs defining cells of the honeycomb structure of the core.

8. The motor vehicle body shell according to claim 7, wherein the ribs defining the cells extend substantially perpendicular to the central wall and to the two side plates.

9. The motor vehicle body shell according to claim 7, wherein the stiffening section is formed by joining two elements of U-shaped cross-section each having an elementary core extended by two elementary side plates,
the central wall of the core of the stiffening section being formed by adjacent elementary cores of the elements of U-shaped cross-section and each side plate of the stiffening section being formed by the two elementary side plates of the elements of U-shaped cross-section extending opposite one another.

10. The motor vehicle body shell according to claim 1, wherein the composite material comprises a polymer selected from a thermoplastic polymer and a thermosetting polymer including a polyamide, a polybutylene terephthalate (PBT), a mixture of polycarbonate and polybutylene terephthalate (PC-PBT), a polymethyl methacrylate (PMMA), or a vinyl ester (VE), an SMC (Sheet Moulding Compound), an epoxy (EP) or a polyester.

11. The motor vehicle body shell according to claim 1, wherein the composite material comprises reinforcing fibres of a material selected from glass, carbon or steel, and arranged according to a structure selected from at least one of a woven structure, a non-woven stitched one-directional sheet of type NCF (Non Crimp Fabric), biaxial and a braided structure.

12. A motor vehicle body shell comprising:
two bays, at least one of the bays being a lateral bay, the two bays being separated by a lateral pillar having at least one stiffening section, the at least one stiffening section having two substantially parallel side plates connected together by a core, wherein:
the stiffening section includes composite material,
the side plates extend substantially parallel to the lateral bay of the body shell, and
the core of the stiffening section that includes the composite material forms, with the side plates, a honeycomb structure;
wherein the stiffening section is housed, at least partially, in a metal box of U-shaped cross-section including the core supported on a first side plate of the stiffening section, a second side plate of the stiffening section closing the metal box of U-shaped cross-section; and
wherein the stiffening section has a generally I-shaped cross-section formed by the two side plates substantially parallel to one another and the core, the core of the stiffening section comprising:
a substantially flat central wall connecting the two substantially parallel side plates by extending substantially perpendicular to the two side plates, and
ribs including composite material extending each side of the central wall and between the two side plates so as to connect the central wall and the two side plates together, the ribs defining cells of the honeycomb structure of the core.

13. The motor vehicle body shell according to claim 7, wherein a thickness of each side plate is substantially constant.

14. The motor vehicle body shell according to claim 7, wherein the composite material comprises continuous reinforcing fibres extending substantially parallel to a longitudinal direction of the lateral pillar, a length of the fibres being substantially equal to a length of the stiffening section.

15. The motor vehicle body shell according to claim 7, wherein the composite material forming the core comprises cut stiffening fibres of random orientation.

16. The motor vehicle body shell according to claim 7, wherein the stiffening section extends over a metal portion of the lateral pillar.

17. The motor vehicle body shell according to claim 16, wherein the metal portion of the lateral pillar comprises at least one of steel, aluminium, and magnesium.

18. The motor vehicle body shell according to claim 7, wherein the composite material comprises a polymer selected from a thermoplastic polymer and a thermosetting polymer including a polyamide, a polybutylene terephthalate (PBT), a mixture of polycarbonate and polybutylene terephthalate (PC-PBT), a polymethyl methacrylate (PMMA), or a vinyl ester (VE), an SMC (Sheet Moulding Compound), an epoxy (EP) or a polyester.

19. The motor vehicle body shell according to claim 7, wherein the composite material comprises reinforcing fibres of a material selected from glass, carbon or steel, and arranged according to a structure selected from at least one of a woven structure, a non-woven stitched one-directional sheet of type NCF (Non Crimp Fabric), biaxial and a braided structure.

* * * * *